United States Patent [19]

Gottsegen et al.

[11] 4,162,029
[45] Jul. 24, 1979

[54] COOLER CHEST/LIQUID DISPENSER COMBINATION

[76] Inventors: Marten Gottsegen, 1212 Lake Shore Dr., Chicago, Ill. 60610; Howard L. Esch, 6161 SW. 123 Ter., Miami, Fla. 33156

[21] Appl. No.: 821,619

[22] Filed: Aug. 3, 1977

[51] Int. Cl.$^2$ .................................................. B67D 5/62
[52] U.S. Cl. ...................................... 222/131; 62/389; 220/23.83; 222/143
[58] Field of Search ............... 222/130, 131, 143, 183, 222/567, 568, 570; 220/23.83, 23.86, 408, 410, 412, 413; 62/389, 400, 457; 206/545, 546

[56] References Cited

U.S. PATENT DOCUMENTS

| | | | |
|---|---|---|---|
| 58,205 | 9/1866 | Bigelow | 222/569 X |
| 3,152,729 | 10/1964 | Piker | 222/131 |
| 3,232,491 | 2/1966 | Hunt | 222/154 |
| 3,395,550 | 8/1968 | Dungan | 62/400 |
| 3,613,872 | 10/1971 | Donnelly | 206/545 |

FOREIGN PATENT DOCUMENTS 1296081  3/1969  Fed. Rep. of Germany ........ 220/23.83

*Primary Examiner*—Robert J. Spar
*Assistant Examiner*—Francis J. Bartuska
*Attorney, Agent, or Firm*—Dulin, Thienpont, Potthast & Snyder

[57] ABSTRACT

A double-walled, insulated portable cooler chest having a separate, self-contained, removable, non-insulated tapered liquid container disposed adjacent one end wall of said cooler and having a lower end wall hole and a dispenser tap therethrough communicating with the exterior through the end-wall of the chest. Liquid dispenser container is blow-molded of a polyolefin polymer with special lugs disposed on each side thereof to cooperatively engage wedge-shaped retaining shoulders in the interior side walls of the chest. An interior nut is utilized to screw threadably engage an inner extension of the tap in a manner so as to simultaneously maintain the tap and the liquid container in proper positions. The liquid container is provided with a lid closure for a top opening of a sufficient size to permit a person to extend one hand into the container for the purpose of removing the nut from the tap extension to permit removal of said liquid container from the cooler chamber for cleaning purposes. A tap assembly compressively confines the liquid container end wall and the end wall of the chest. The tapered chest wall shoulders cooperatingly urge the container end wall into contact with the interior end wall as the tapered container is pushed downwardly in the chest, thereby insuring proper tap hole alignment and secure confinement of the liquid container without stress on the tap that could result in misalignment and leakage.

7 Claims, 2 Drawing Figures

COOLER CHEST/LIQUID DISPENSER COMBINATION

FIELD

This invention relates to the field of portable cooler chests for general and recreational use, and more particularly to an improved chest in which a liquid container is disposed interiorly of the chest with an exteriorly actuable dispensing tap in communication therewith so that beverage in the container may be withdrawn by operation of the tap. A special wedge-shaped container having intergrally molded lugs thereon cooperatingly engage shoulders on the interior side walls of the chest to position and secure the container in the chest interior with accurate alignment.

BACKGROUND

Cooler chests of various shapes and sizes are and have been in extremely wide usage in connection with a wide variety of outdoor activities of families and friends. Generally, a supply of ice is disposed in the cooler chest chamber to refrigerate food supplies, fish catches, etc., for a day's activities. Heretofore, it has been necessary to provide a second unit, generally in the form of an insulated jug for beverages.

Jugs of this nature are generally provided with an exterior tap means for withdrawing the beverages therefrom without removal of the jug lid or necessitating a pouring operation. However, it has been necessary to transport and to carry two separate items to the scene of the outdoor activities.

There also have been a number of attempts to provide cooling appliances or water coolers in which a fluid container is disposed interiorly of a larger container in having an exterior tap. Examples of these are found in typical U.S. Patents as follows: Nos. 700,005; 1,776,307; 305,269; 1,648,594; 2,151,104; and 3,613,872. Other typical patents showing containers within other containers, not having exterior taps are shown in U.S. Pat. Nos. 3,459,295; 3,266,623; 3,288,344; and 3,670,918.

Of these prior art approaches to the problems, the Armstrong U.S. Pat. No. 700,005 and the Bosque U.S. Pat. No. 1,776,307 appear to be the most pertinent. However, both patents are extremely complex water cooler devices which do not offer the advantages of the present invention. Similarly, Japanese Patent to Kondo 46-20990 of 1967 calls for an integral fluid storage tank in an insulated icebox which has both an exterior tap and an exterior communicating air vent system.

Accordingly, there is a need for a simple cooler chest having a self-contained liquid dispenser for beverages which maintains all the conveniences of a separate cooler chest and thermos jug without the need to transport the second item to the site of the activities.

THE INVENTION

OBJECTS

It is among the objects of the present invention to provide a cooler chest which incorporates an interior chamber for the reception of ice supply, an assortment of foods, and a removable self-contained liquid dispenser means for a beverage, with no transfer of odors, tastes or the like therebetween.

It is another object of this invention to provide the liquid dispenser means with an exterior tap whereby beverage may be withdrawn therefrom without opening the chest, thereby holding its refrigeration longer.

It is another object of this invention to provide means whereby the exterior tap may be extended through one wall of the cooler chest into open communication with the interior of the removable liquid container disposed therein.

Another object of the invention is to provide means whereby the exterior tap may be manually removed to permit removal of the liquid container from the cooler chest for cleaning and other purposes.

It is another object of the invention to provide a double-wall insulated, portable cooler chest having a separate, self-contained removable, non-insulated, tapered liquid container disposed adjacent one end wall of said cooler.

It is another object of the invention to provide an easily manufactured liquid dispenser container having special lugs disposed on each side thereof to cooperatingly engage wedge-shaped retaining shoulders on interior side walls of a cooler chest which is adapted to receive the liquid dispenser container.

It is another object of the invention to provide an improved combination of removable interior liquid container with a cooler chest in which the liquid container is tapered and cooperatingly fits with tapered chest wall shoulders which cooperatingly urge the container end wall into contact with the interior end wall as the tapered container is placed in the chest to insure proper tap hole alignment and secure confinement of the liquid container without such stresses on the tap that could result in misalignment and leakage.

Still further, and other objects will become evident from the description which follows.

DRAWINGS

The principles of the invention are better illustrated by the drawings in which:

FIG. 1 is a perspective view of the cooler chest with parts broken away to better illustrate the self-contained liquid dispenser and exterior tap of the present invention, including the particular cooperating shoulder and lug means on the interior chest wall and on the removable tapered liquid container; and FIG. 2 is a fragmentary, enlarged cross-sectional view of the liquid container and chest taken along line 2—2 of FIG. 1.

SUMMARY OF THE INVENTION

The present invention is directed to a cooler chest having a self-contained liquid dispenser for beverages, including tap means which extends through one wall of the cooler in a manner whereby the beverage in a container may be withdrawn by operation of the tap. The main portion of the cooler chest chamber may be packed with ice or other cooling means, and an assortment of foods, fish catches, etc. in a conventional manner, the ice serving to refrigerate not only the food, but also the beverage in the container. The beverage container is disposed adjacent one inner end wall of the chest. Being sealed, there is no transfer of odors or melted ice water to the beverage.

The chest comprises a double-walled, insulated, portable cooler. The beverage container is a separate self-contained, removable, non-insulated, tapered liquid container disposed adjacent one end wall of the cooler. The double-walled chest has a recessed portion near the lower edge of the end wall and has a hole disposed therein. Likewise, the lower end wall of the liquid container has a hole which, when aligned with the hole in the chest end wall, receives a dispensing tap therethrough. An interior nut means is utilized to screw threadably engage an inner extension of the tap in a manner so as to simultaneously maintain the tap and the liquid container in proper positions. The liquid container is provided with a lid closure means for a top opening of sufficient size to permit a person to extend one hand into the container for the purpose of removing the nut means from the tap extension thereby permitting removal of the liquid container from the cooler chamber for cleaning purposes. The bottom end wall opening of the beverage container receives a rubber grommet which engages an O-ring of the tap nut means to seal the opening and provide a resilient member between the container wall and the inner wall of the chest. In addition, the tap extension is sufficiently threaded to permit sealingly engaging the tap to the liquid container separate and apart from the chest if need be.

The liquid dispenser container is blow-molded of a polyolefin polymer, and has special lugs disposed on each side wall thereof. These lugs cooperatingly engage wedge-shaped retaining shoulders molded on the interior side walls of the chest. The tapered chest wall shoulders cooperatingly urge the container end wall into contact with the interior end wall of the chest as the tapered beverage container is pushed downwardly into the chest. This insures proper tap hole alignment and secure confinement of the liquid container without stress on the tap that could result in misalignment and leakage. When the nut is threadedly engaged on the top extension, the tap means compressively confines the liquid container end wall and the end wall of the chest so that there is no leakage.

DETAILED DESCRIPTION

Figure 1:
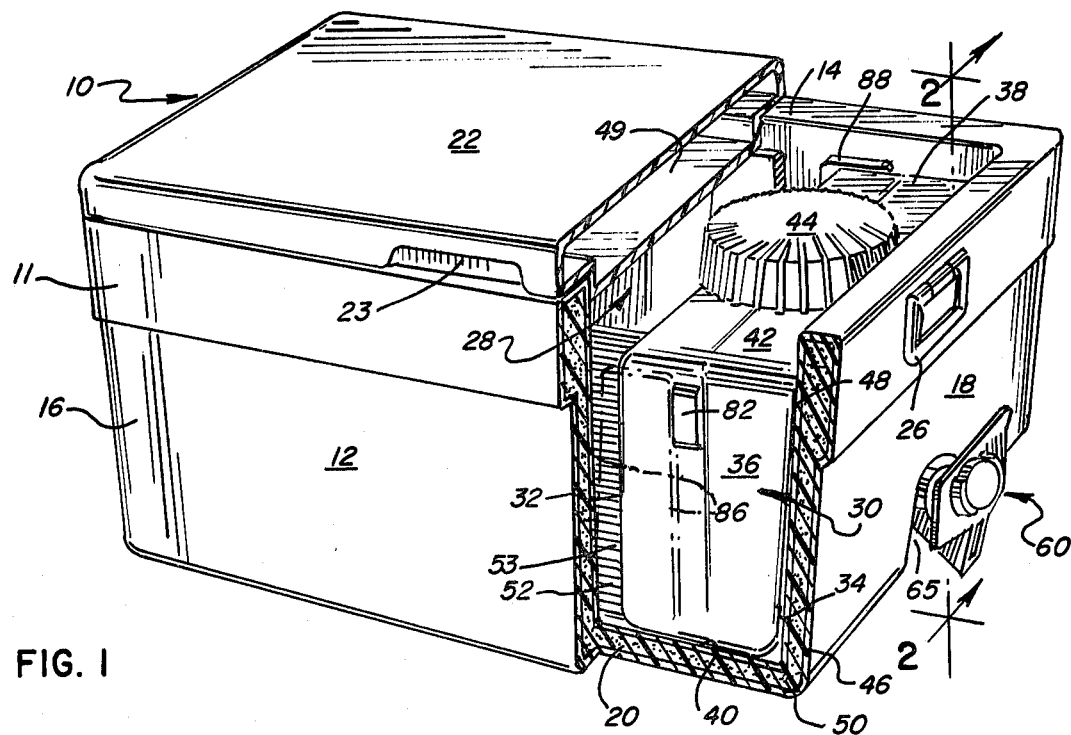
Figure 2:
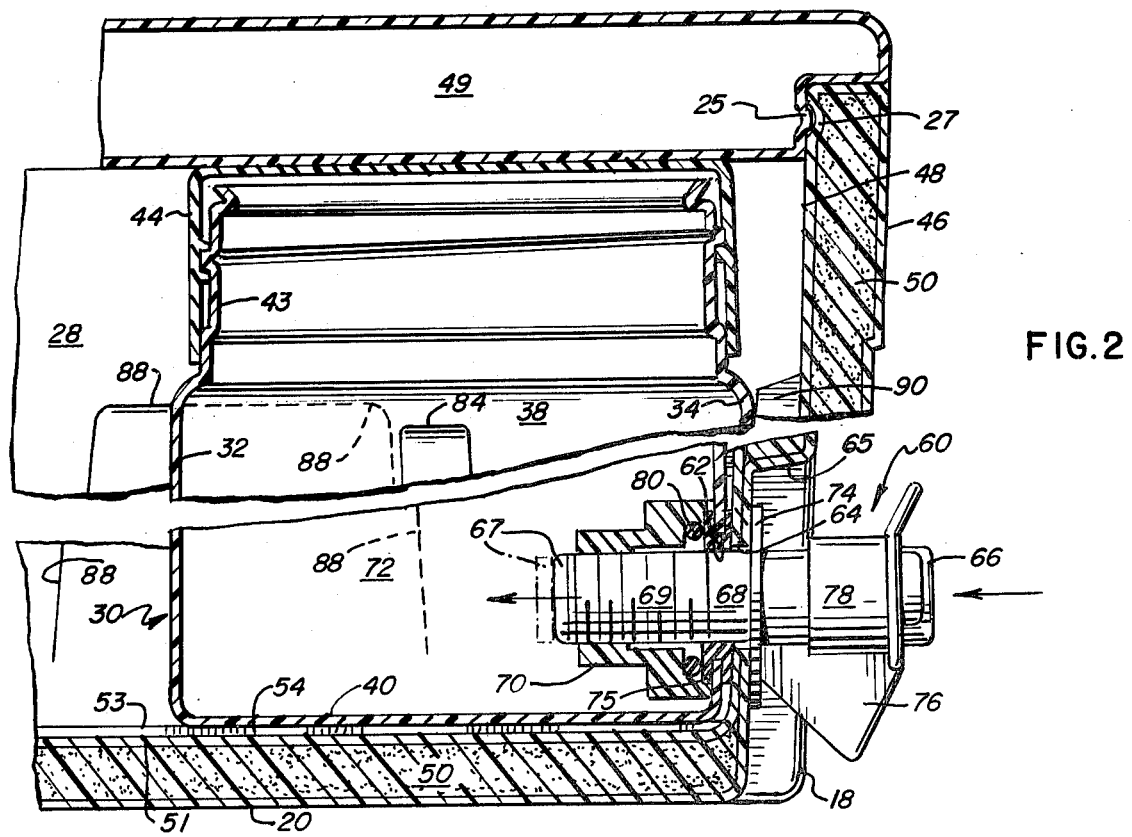

The following detailed description is by way of illustration, and not by way of limitation of the principles of the invention. Referring first to FIG. 1, chest 10 has a main body portion 11 of tapered side walls 12 and 14, opposed, inwardly tapering end wall 16 and 18, a bottom wall 20 and a hinged closure lid 22. The closure lid 22 may be, for example, of the snap-on variety, or of the hinge type, with a recess 23 to assist an opening lid. The lid may be hollow as at 49 (FIG. 2) or contain insulation. Handle means 26 may be provided on the opposed end wall 16 and 18. To assist in keeping the lid securely closed, shoulders 25 are provided in the lid spaced along the recessed periphery thereof as best seen in FIG. 2. These shoulders cooperatingly engage recesses 27 in the facing side and end walls of the chest to provide a snap-lock retaining engagement of the lid on the chest.

Cooler chests of this nature may be provided in a variety of sizes and shapes, all of which provide an interior chamber 28 for receiving an ice supply and food which is refrigerated thereby. In use, the lid 22 is opened for selective removal of the foods. However, the lid need not be opened at any time for the dispensing of liquids.

Liquid container 30 is removably positionable in the cooler chest 10. In the preferred form, the beverage container 30 is designed to provide a maximum content volume relative to the amount of space it occupies within the cooler chest chamber 28. For example, as best illustrated in FIG. 1, the beverage container 30 may be sized and shaped to substantially occupy a predetermined amount of space along one end wall, such as 18, within the side walls 12 and 14, in the bottom 20 and lid 22 of the chest 10.

As illustrated, the beverage container 30 comprises two end walls 32 and 34, which are tapered relative to each other. In the example shown, the end wall 32 is substantially vertically planar, while the end wall 34 is tapered inwardly from top to bottom. In this manner the slope of the end wall 34 of the liquid container matches the slope of the shoulder 90 of end wall 18 of the chest. The liquid container also has tapered side walls 36 and 38, a bottom wall 40 and top wall 42. The top wall 42 of the container 30 is provided with an enlarged opening 43 having an appropriate closure lid 44. The opening and lid may be in a variety of forms, but is sized to provide access means for a person's hand to remove the tap means described below.

Cooler chest 10 main body portion 11 comprises an outer shell 46, an inner liner 48, and insulation material 50 disposed therebetween. The bottom inner liner portion 51 contains a plurality of ribs 52, 53, etc. on which the bottom 40 of the liquid container rests. This provides space 54 that permits contact of melting ice water with the container thereby cooling it. It also permits draining the interior of the chest.

A tap means 60 extends through axially aligned holes 62 and 64 in the end wall 34 of the liquid container, and end wall 18 of the chest, respectively. For increased rigidity, and reduction of the length of the tap, the end wall 18 of the chest is recessed at 65 so the outer shell 46 and inner liner 48, come into mating engagement in the area of the tap, as best seen in FIG. 2. The tap illustrated has a push button 66 which reciprocatingly opens to the position 67 as seen in phantom in FIG. 2.

The tap of this example is molded of a plastic material. The tap comprises a shank portion 68 which extends through the axially aligned holes 62 and 64, and includes an inner, extended threaded end portion 69 for the reception of a suitable nut 70 within the inner chamber 72 of the liquid container 30. The nut 70 cooperates with an annular flange 74 positioned against the exterior surface of outer shell 46 in the recessed area 65. Fitted around the hole 62 in the inner container 30, is a grommet 75. A discharge spout 76 extends outwardly and downwardly of the outer body portion 78 of the tap to discharge the contents of the liquid container 30 into a suitable receptacle upon actuation of the tap valve in a conventional manner.

As best seen in FIG. 2, a gasket such as O-ring 80 is disposed between the nut 70 and the grommet 75 for sealing purposes. When the nut is screwed on tightly, a tight seal is formed between the parts, with the O-ring and grommet being compressively secured between the end wall 34 of the liquid container and the double end wall formed by the mating of the outer shell 46 and inner liner 48 in the recessed area 65.

The inner liquid container 30 also has a pair of lugs 82 (see FIG. 1) and 84 (see FIG. 2) disposed on the opposed side walls 36 and 38, respectively of the container. These may be integrally molded with the inner container walls during the operation of blow-molding the container.

The inner liner wall 48 contains a pair of tapered shoulders 86 (see Item 86 in phantom in FIG. 1) and 88 which cooperatingly engage with the lugs on the side walls of the liquid container 30. As seen in the Figures, the shoulders are tapered outwardly from top to bottom so that upon pressing the container downwardly in the chest, these shoulders cooperatingly urge the container end wall 34 into contact with the inner liner surface of the tapered chest end wall 18. This insures proper tap hole alignment and secure confinement of the liquid container, without stress on the tap that results in misalignment and leakage. By this cooperating engagement of lug with shoulder, the tap does not bear the entire stress of the liquid mass within the beverage container 30 as the entire chest and container assembly 10 is moved around. As the beverage in the container 30 sloshes around on movement, stress can be applied to the tap causing axial misalignment and leakage. The provision of the lug and shoulders prevents this type of leakage stressing. As can best be seen in FIG. 2, the width of the bottom of the container 30 is smaller then the upper portion thus mating with the inward taper of the side and end walls of the chest.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A cooler chest and beverage container combination comprising:
   (a) a main body portion having a pair of upstanding insulated side walls, a pair of upstanding insulated end walls, and an insulated bottom wall defining an interior chamber having interior wall surfaces;
   (b) a lid closure for the top of said body portion;
   (c) a removable liquid container disposed in said interior chamber, said liquid container comprising: a first and a second spaced apart end wall, a pair of spaced apart side walls joining said end walls, a bottom wall, and a top wall, together defining in interior space, said top wall includes an opening of sufficient size to permit removal of said tap means;
   (d) said first one of said liquid container end walls being disposed in contact with at least portions of the inner surface of a first one of said upstanding insulated end walls of said main body portion;
   (e) an exterior tap means having an open shank portion extending through apertures in said first body portion end wall and said first liquid container end wall adjacent the bottom walls into said interior space of said liquid container to withdraw liquid therefrom upon actuation of said tap means from the exterior without removal of said liquid container or opening of said lid closure;
   (f) at least one lug disposed on each of said liquid container side walls;
   (g) shoulder means disposed on the interior wall surface each of said main body portion side walls;
   (h) said lugs and shoulder means cooperating to urge the first liquid container end wall into contact with said main body portion end wall and alignment of said tap means apertures;
   (i) said tap means includes means for removably securing said tap means in position comprising an exteriorly screw threaded end of said shank portion extending into said interior space, a nut threadable thereon, sealing means disposed around said liquid container aperture, and an exterior annular flange formed integral with said tap means, so that said nut sealingly compresses together said seal, said first liquid container end wall, and said first main body portion end wall; and
   (j) said insulated end walls of said main body portion comprise an outer shell spaced from an inner liner and having insulation means therebetween, and said outer shell is recessed in the area of said tap means so that said outer shell and said liner are in substantial contact in the area of said tap means annular flange.

2. Cooler chest and beverage container combinations as in claim 1 wherein said first end wall of said main body portion is inclined inwardly from top to bottom, and said first end wall of said liquid container is inclined inwardly so that said liquid container in lateral cross-section exhibits a taper from top to bottom.

3. Cooler chest and beverage container combinations as in claim 1 wherein said shoulders are laterally tapered, widening from top to bottom, to provide a camming surface to urge said liquid container laterally toward said first main body portion end wall as said container is moved downwardly into said main body portion interior chamber.

4. Cooler chest and beverage container combinations as in claim 2 wherein said liquid container side walls are tapered inwardly from top to bottom as seen in longitudinal cross-section.

5. Cooler chest and beverage container combinations as in claim 2 wherein said inner surface of said main body portion end walls have disposed therein shoulders projecting inwardly into said interior chamber into contact with said tapered end wall of said liquid container.

6. Cooler chest and beverage container combinations as in claim 4 wherein said main body portion side walls are tapered inwardly from top to bottom as seen in cross section.

7. Cooler chest and beverage container combinations as in claim 6 wherein said shoulders means on the interior portion side walls of said main body portion are tapered inwardly from top to bottom as seen in cross-section.

* * * * *

UNITED STATES PATENT AND TRADEMARK OFFICE
CERTIFICATE OF CORRECTION

PATENT NO. : 4,162,029
DATED : July 24, 1979
INVENTOR(S) : Gottsegen et al.

It is certified that error appears in the above-identified patent and that said Letters Patent are hereby corrected as shown below:

Column 3, line 32, "top" should read --tap--.

Signed and Sealed this

Fourth Day of December 1979

[SEAL]

Attest:

SIDNEY A. DIAMOND

Attesting Officer

Commissioner of Patents and Trademarks